United States Patent [19]

Lee

[11] Patent Number: 5,777,818

[45] Date of Patent: Jul. 7, 1998

[54] MAGNETIC HEAD POSITION DETECTING APPARATUS OF TAPE RECORDER

[75] Inventor: Ju-hyung Lee, Suwon, Rep. of Korea

[73] Assignee: Samsung Electronics Co., Ltd., Kyungki-do, Rep. of Korea

[21] Appl. No.: 780,223

[22] Filed: Jan. 8, 1997

[30] Foreign Application Priority Data

Jan. 17, 1996 [KR] Rep. of Korea ............ 1996-858
Jan. 17, 1996 [KR] Rep. of Korea ............ 1996-861
Jan. 17, 1996 [KR] Rep. of Korea ............ 1996-864

[51] Int. Cl.⁶ .................................................. G11B 15/14
[52] U.S. Cl. ................................................ 360/84; 360/70
[58] Field of Search ................................ 360/84, 85, 95, 360/128, 61, 64, 70, 75, 77.12

[56] References Cited

U.S. PATENT DOCUMENTS

| 4,912,571 | 3/1990 | Sekiya et al. ............ 360/70 |
| 4,914,531 | 4/1990 | Kaaden et al. ........... 360/70 |
| 4,930,025 | 5/1990 | Oberjatzas et al. ...... 360/70 |
| 5,034,829 | 7/1991 | Mahr ...................... 360/84 |
| 5,119,245 | 6/1992 | Shin ...................... 360/70 |
| 5,243,474 | 9/1993 | Mitsuhashi ............... 360/70 |
| 5,255,134 | 10/1993 | Sekiya et al. .......... 360/70 |
| 5,276,568 | 1/1994 | Murata et al. ........... 360/70 |
| 5,444,581 | 8/1995 | Kunihira et al. ........ 360/84 |
| 5,604,648 | 2/1997 | Oh ........................ 360/70 |

FOREIGN PATENT DOCUMENTS 57-212619  12/1982  Japan ....................... 360/84

*Primary Examiner*—Jefferson Evans
*Attorney, Agent, or Firm*—Sughrue, Mion, Zinn, Macpeak & Seas, PLLC

[57] ABSTRACT

A magnetic head position detecting apparatus of a tape recorder, which sharply reduces assembly error and which has a simple structure, is provided. The magnetic head position detecting apparatus includes a blocking plate which has a predetermined width and is formed on the upper surface of the rotary drum in vertical alignment with the magnetic head. A sensing device is provided for sensing the blocking plate, and a support fixed on a deck, for supporting the sensing device.

4 Claims, 7 Drawing Sheets

5,777,818

1

MAGNETIC HEAD POSITION DETECTING APPARATUS OF TAPE RECORDER

BACKGROUND OF THE INVENTION

The present invention relates to a magnetic head position detecting apparatus of a tape recorder and, more particularly, to a magnetic head position detecting apparatus of a tape recorder which simplifies the head drum structure and improves assembly characteristics.

Generally, a tape recorder such as a video tape recorder (VTR) has a head drum for slantingly scanning a tape with respect to the tape traveling direction, to read information from the tape or record information on the tape.

Referring to FIGS. 1 and 2 which show a typical head drum 10, a rotary drum 20 having a plurality of magnetic heads 21 and a rib 20a which is formed at the circumference of the upper surface thereof, a stationary drum 30 and a drum motor 40 are concentrically coupled to a rotary shaft 31. The rotary drum 20 is pushed to be fitted with the rotary shaft 31 and the rotary shaft 31 is rotatably coupled with the stationary drum 30 fixed on a deck member 1 by bearings 33.

The stationary drum 30 has a stator transformer 32 therein and a circuit substrate 42 fixed at the bottom of the stationary drum 30. Also, a rotor transformer 22 is installed in the rotary drum 20, opposite to the surface of the stator transformer 32. The drum motor 40 includes a stator 45 fixed on the circuit substrate 42, a casing 44 to which the rotary shaft 31 is pushed to be fitted, and a rotor 43 attached to the inner circumference of the casing 44.

Generally, two or more magnetic heads 21 are arranged in the rotary drum 20, being separated from each other by a predetermined distance. Also, the drum motor 40 is provided with an apparatus for detecting the position of a magnetic head 21 when one of the magnetic heads 21 is prepared to scan the tape. Also, a control signal is applied to each magnetic head 21 in sequence by a microcomputer (not shown) operated by a detection signal from the magnetic head position detecting apparatus.

The detecting apparatus includes a phase generator (PG) magnet 41 coupled with the casing 44, and a hall sensor 46 installed on the circuit substrate 42, for sensing the PG magnet 41.

Here, one end of the PG magnet 41 is opposite to the surface of the stator 45 and the other end thereof extends to the surface of the casing 44. Also, as shown in FIG. 1, the PG magnet 41 and the magnetic head 21 are separated by a 30° rotation of the head drum.

In the above magnetic head position detecting apparatus, the PG magnet 41 is detected by the hall sensor 46 when one of magnetic heads 21 is prepared to scan the tape. After a predetermined lapse of time from the detection starting point of the PG magnet 41, a magnetic head control signal is applied to the other magnetic head.

For example, after a predetermined lapse of time from a detection starting point of the PG magnet 41, a control signal is applied to the magnetic head 21 tracing the tape when the drum motor 40 is driven with a predetermined pulse number. Thereafter, the control signal is applied to the other magnetic head during a predetermined pulse number of the drum motor 40. That is, a control signal is applied to the plurality of magnetic heads 21 in sequence from the microcomputer (not shown) after a predetermined lapse of time from a detection starting point of the PG magnet 41.

However, in the above conventional magnetic head position detection apparatus, since the PG magnet 41 is installed in the drum motor 40, it is difficult to accurately set the position of the PG magnet 41 with respect to the magnetic head 21, thereby causing an error of the assembling position of the PG magnet 41 with respect to the magnetic head 21 among each assembled head drum. Thus, operational reliability of the magnetic head as well as productivity are lowered.

SUMMARY OF THE INVENTION

To solve the above problems, it is an object of the present invention to provide a magnetic head position detecting apparatus of a tape recorder which can be assembled with a simple structure and reduce assembling error.

As an aspect of the present invention, there is provided a magnetic head position detecting apparatus of a tape recorder having a deck, and a rotary drum including a plurality of magnetic heads therein and a rib at the circumference of an upper surface of the rotary drum, the magnetic head position detecting apparatus comprising: a blocking plate having a predetermined width, formed on the upper surface of the rotary drum in vertical alignment with a corresponding one of the magnetic heads; sensing means for sensing the blocking plate; and a support, fixed on the deck, for supporting the sensing means.

As another aspect of the present invention, there is provided a magnetic head position detecting apparatus of a tape recorder having a deck, and a rotary drum including a plurality of magnetic heads therein and a rib at the circumference of an upper surface of the rotary drum, the magnetic head position detecting apparatus comprising: a window having a predetermined width, formed at the rib in vertical alignment with a corresponding one of the magnetic heads; sensing means for sensing the window; and a support, fixed on the deck, for supporting the sensing means.

As still another aspect of the present invention, there is provided a magnetic head position detecting apparatus of a tape recorder having a deck, and a rotary drum including a plurality of magnetic heads therein and a rib at the circumference of an upper surface of the rotary drum, the magnetic head position detecting apparatus comprising: a magnet having a predetermined width, formed on the upper surface of the rotary drum; a hall device for detecting magnetic flux generated from the magnet; and a support, fixed on the deck, for supporting the hall device.

BRIEF DESCRIPTION OF THE DRAWINGS

The above object and advantages of the present invention will become more apparent by describing in detail preferred embodiments thereof with reference to the accompanying drawings, in which.

DETAILED DESCRIPTION OF THE PREFERRED EMBODIMENTS

Figure 1:
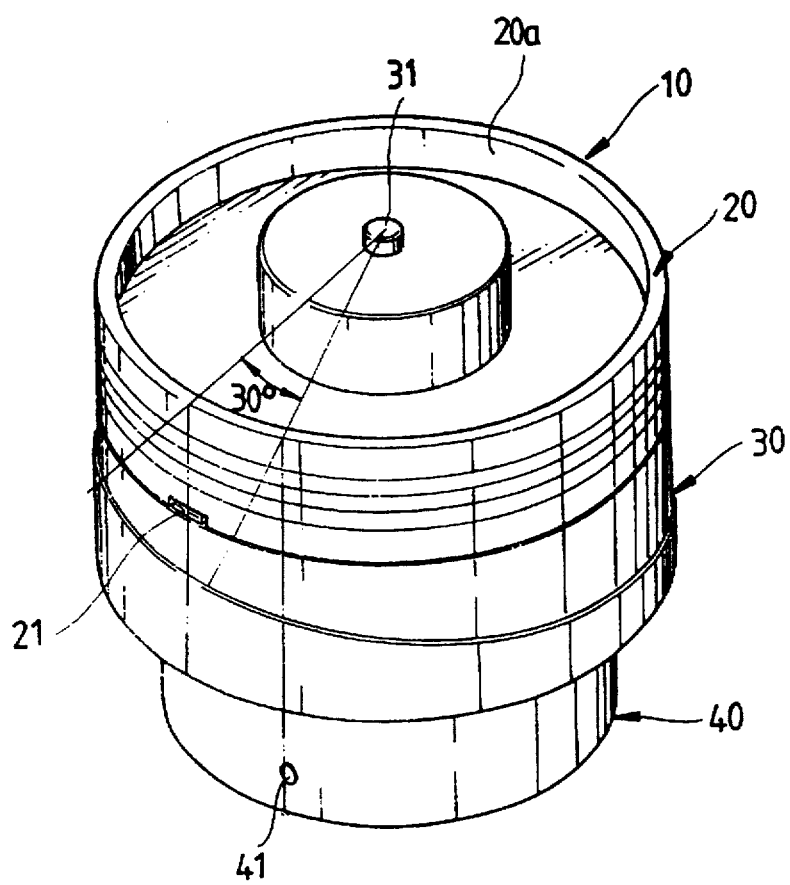
FIG. 1 is a perspective view of a head drum adopting a conventional magnetic head position detecting apparatus.
Figure 2:
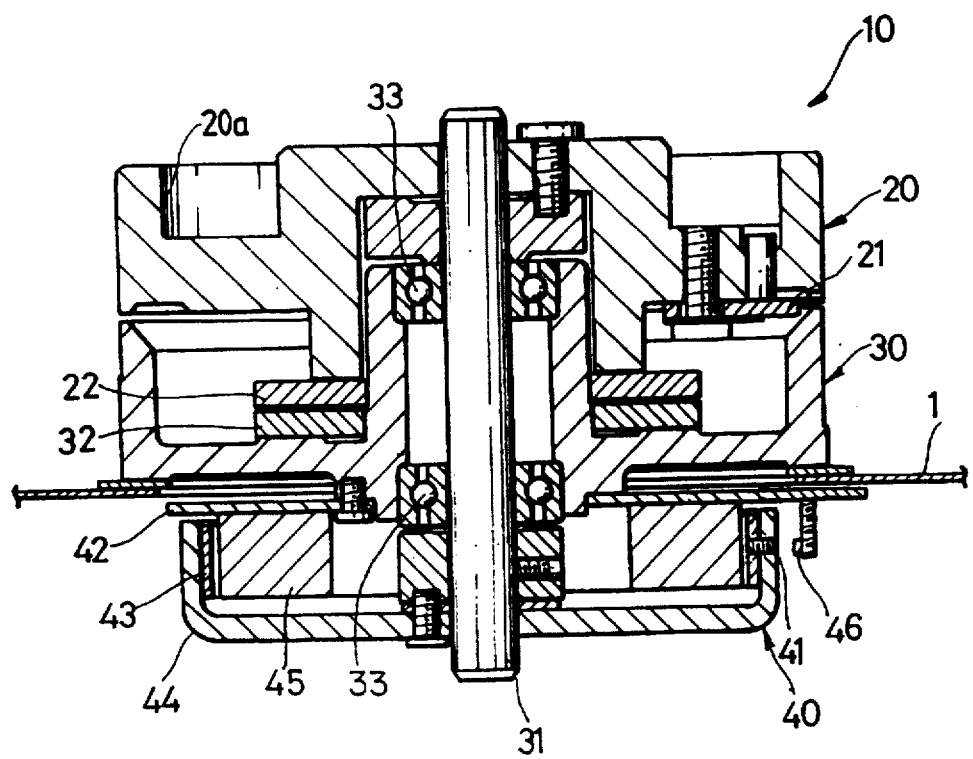
FIG. 2 is a cross-sectional view of the head drum shown in FIG. 1.
Figure 4:
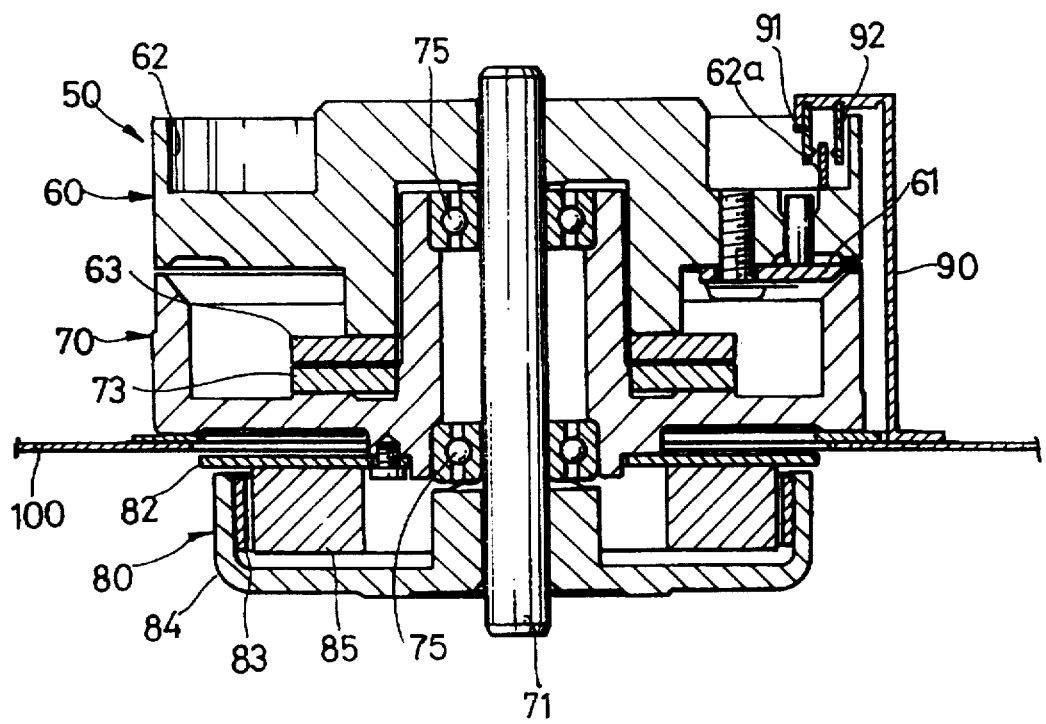
FIG. 4 is a cross-sectional view of the head drum shown in FIG. 3.
Figure 3:
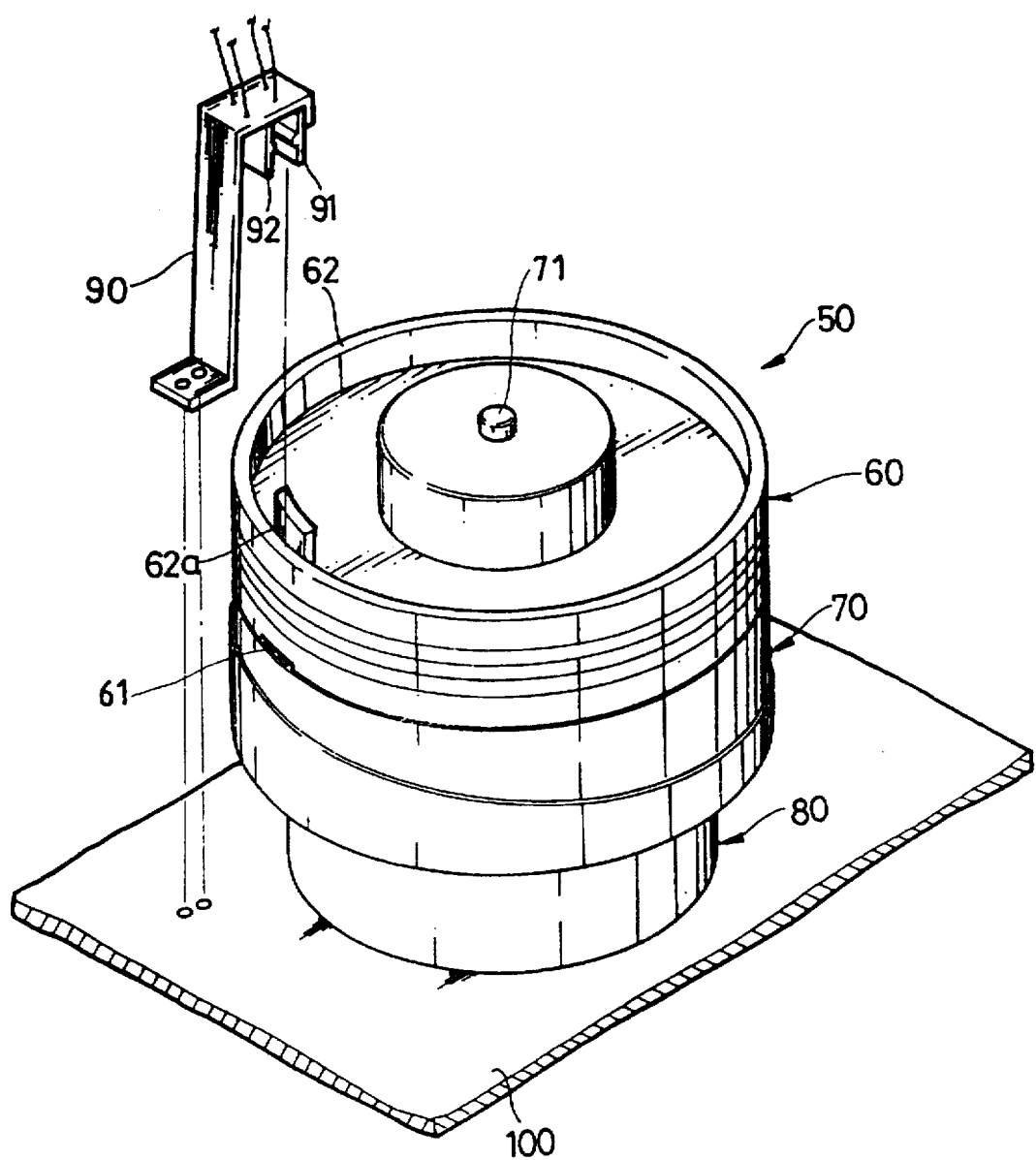
FIG. 3 is a perspective view of a head drum adopting a magnetic head position detecting apparatus according to a preferred embodiment of the present invention.

Referring to FIGS. 3 and 4, a head drum 50 includes a rotary drum 60 having a plurality of magnetic heads 61 which are arranged being separated from each other by a predetermined distance and having an annular rib 62 formed at the circumference of the upper surface thereof, a stationary drum 70 and a drum motor 80 which are concentrically coupled around a rotary shaft 71. The rotary drum 60 is pushed to be fitted with the rotary shaft 71 and the rotary shaft 71 is rotatably coupled with the stationary drum 70 fixed on a deck member 100 by bearings 75.

The stationary drum 70 has a stator transformer 73 therein and a circuit substrate 82 fixed at the bottom of the stationary drum 70. Also, a rotor transformer 63 is installed in the rotary drum 60, opposite to the surface of the stator transformer 73. The drum motor 80 includes a stator 85 fixed on the circuit substrate 82, a casing 84 to which the rotary shaft 71 is pushed to be fitted, and a rotor 83 attached to the inner circumference of the casing 84.

According to the present invention, there is provided an apparatus for detecting the position of the magnetic head 61, when one of the magnetic heads 61 is prepared to scan a tape (not shown). A control signal is applied to each magnetic head 61 in sequence by a microcomputer (not shown) operated by a detection signal from the magnetic head position detecting apparatus.

The magnetic head position detecting apparatus includes a blocking plate 62a having a predetermined width, installed at the upper surface of the rotary drum 60 in vertical alignment with the magnetic head 61, sensing means for sensing the blocking plate 62a, and a support 90 for supporting the sensing means.

The support 90 is fixed to a deck 100, and the sensing means includes a luminescent device 91 for emitting a beam and a receiving device 92 for receiving the emitted beam.

The operation of the magnetic head position detecting apparatus of a tape recorder having the above structure according to the preferred embodiment of the present invention will be described below.

The beam emitted from the luminescent device 91 during the rotation of the rotary drum 60 is received by the receiving device 92. Meanwhile, when the blocking plate 62a is located between the luminescent device 91 and the receiving device 92, the beam emitted from the luminescent device 91 is blocked by the blocking plate 62a, so that the receiving device 92 cannot detect the beam emitted from the luminescent device 91. After a predetermined lapse of time from when the beam is first blocked, a control signal is applied to one of the magnetic heads 61 and the magnetic head 61 which receives the control signal starts to scan the tape, simultaneously. Subsequently, after a predetermined lapse of time, the control signal is applied to the other magnetic head 61.

For example, after a predetermined lapse of time from when the beam is first blocked, a control signal is applied to the magnetic head 61 scanning the tape during the driving of the drum motor 80 with a predetermined pulse number. Then, the control signal is applied to the other magnetic head 61 for a predetermined pulse number of the drum motor 80. That is, a control signal is applied to the plurality of magnetic heads 61 in sequence from the microcomputer (not shown).

Figure 5:
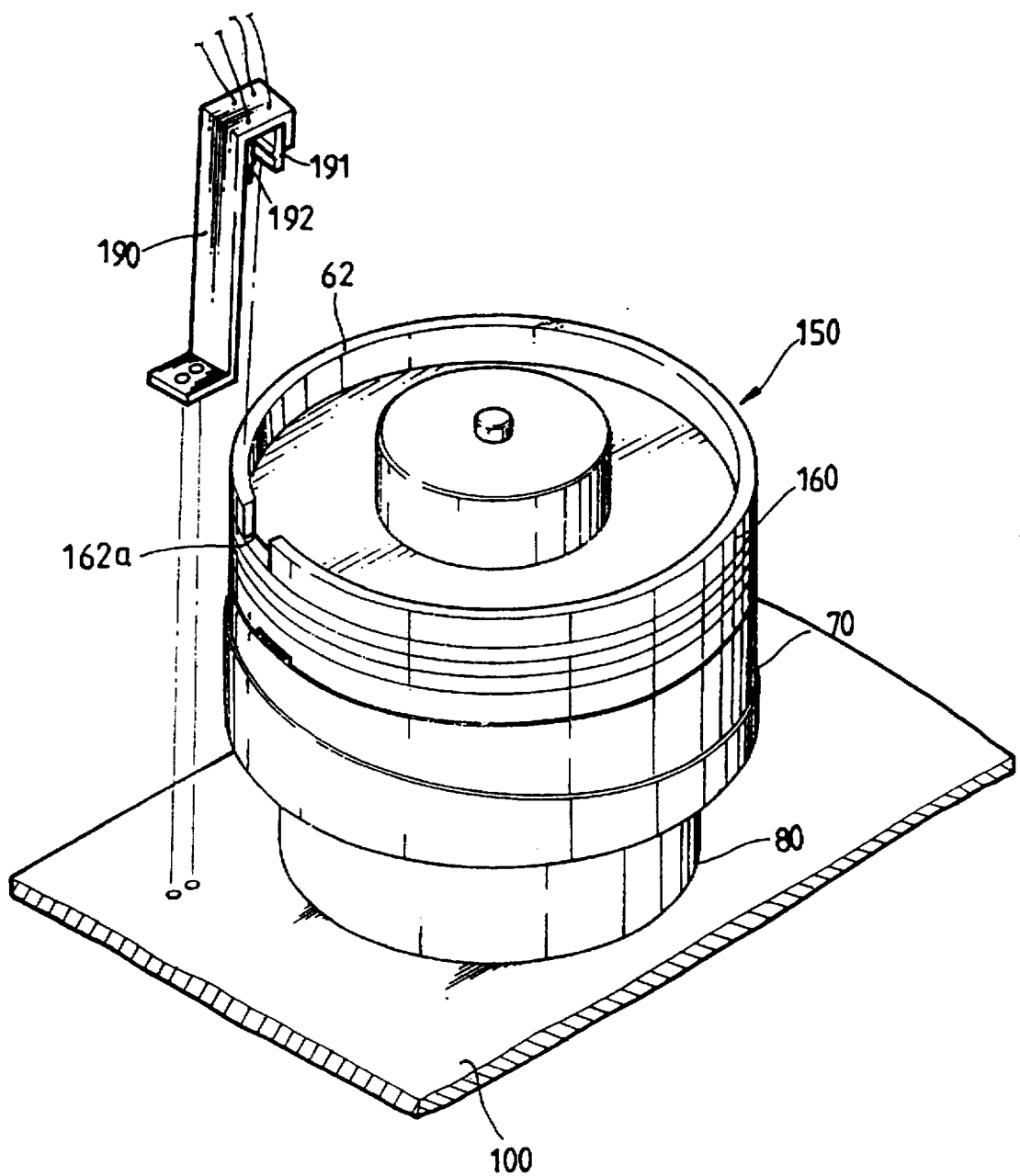
FIG. 5 is a perspective view of a head drum adopting a magnetic head position detecting apparatus according to another preferred embodiment of the present invention.
Figure 6:
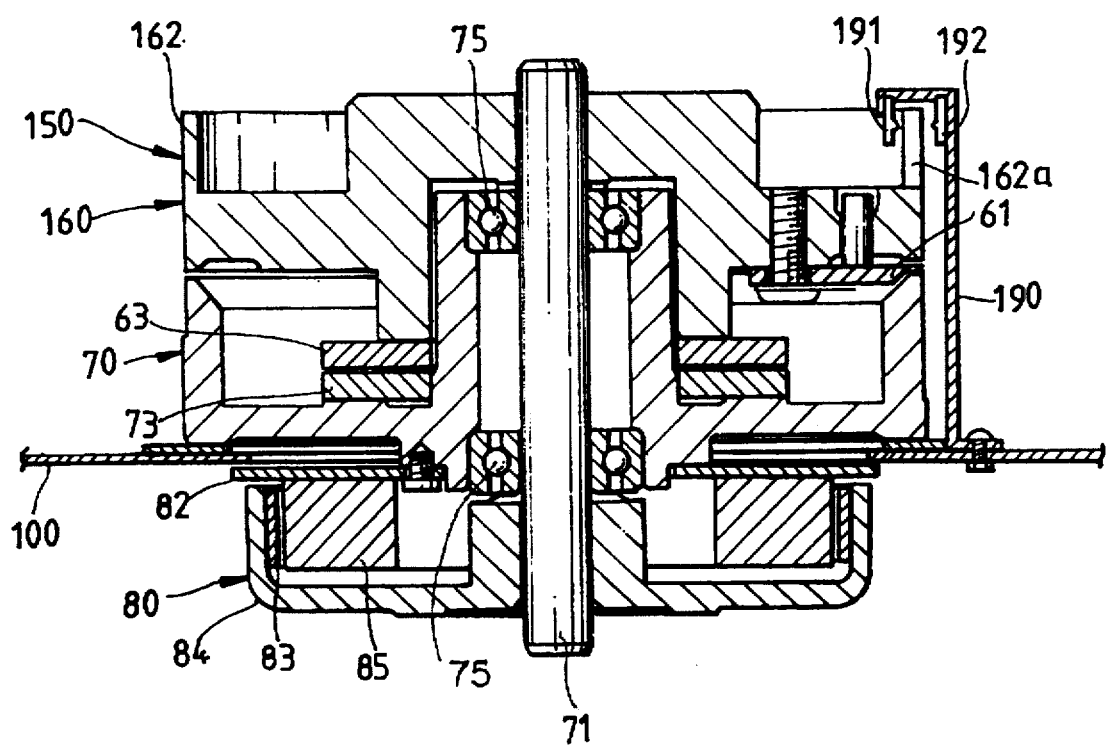
FIG. 6 is a cross-sectional view of the head drum shown in FIG. 5.

FIGS. 5 and 6 show a head drum 150 adopting a magnetic head position detecting apparatus according to another preferred embodiment of the present invention. Here, the same reference numerals as those of FIGS. 3 and 4 represent the same elements. Referring to FIGS. 5 and 6, the magnetic head position detecting apparatus includes sensing means for sensing a window 162a having a predetermined width, and a support 190 fixed on the deck 100 for supporting the sensing means.

The sensing means has a luminescent device 191 for emitting a beam and a receiving device 192 for receiving the emitted beam passing through the window 162a.

In the operation of the magnetic head position detecting apparatus of a tape recorder having the above structure according to the present embodiment, as the rotary drum 160 rotates, when the window 162a is positioned at the sensing means, the beam emitted from the luminescent device 191 is detected by the receiving device 192. After a predetermined lapse of time from the start of detection, a control signal is applied to one of the magnetic heads 61 and the magnetic head 61 which receives the control signal starts to scan the tape (not shown), simultaneously. Subsequently, after a predetermined lapse of time, the control signal is applied to the other magnetic head 61.

For example, after a predetermined lapse of time from when the beam is first detected, a control signal is applied to the magnetic head 61 scanning the tape during the driving of the drum motor 80 with a predetermined pulse number. Then, the control signal is applied to the other magnetic head(s) 61 for a predetermined pulse number of the drum motor 80. That is, after a predetermined lapse of time from the start of detection, a control signal is applied to the plurality of magnetic heads 61 in sequence from the microcomputer (not shown).

Figure 7:
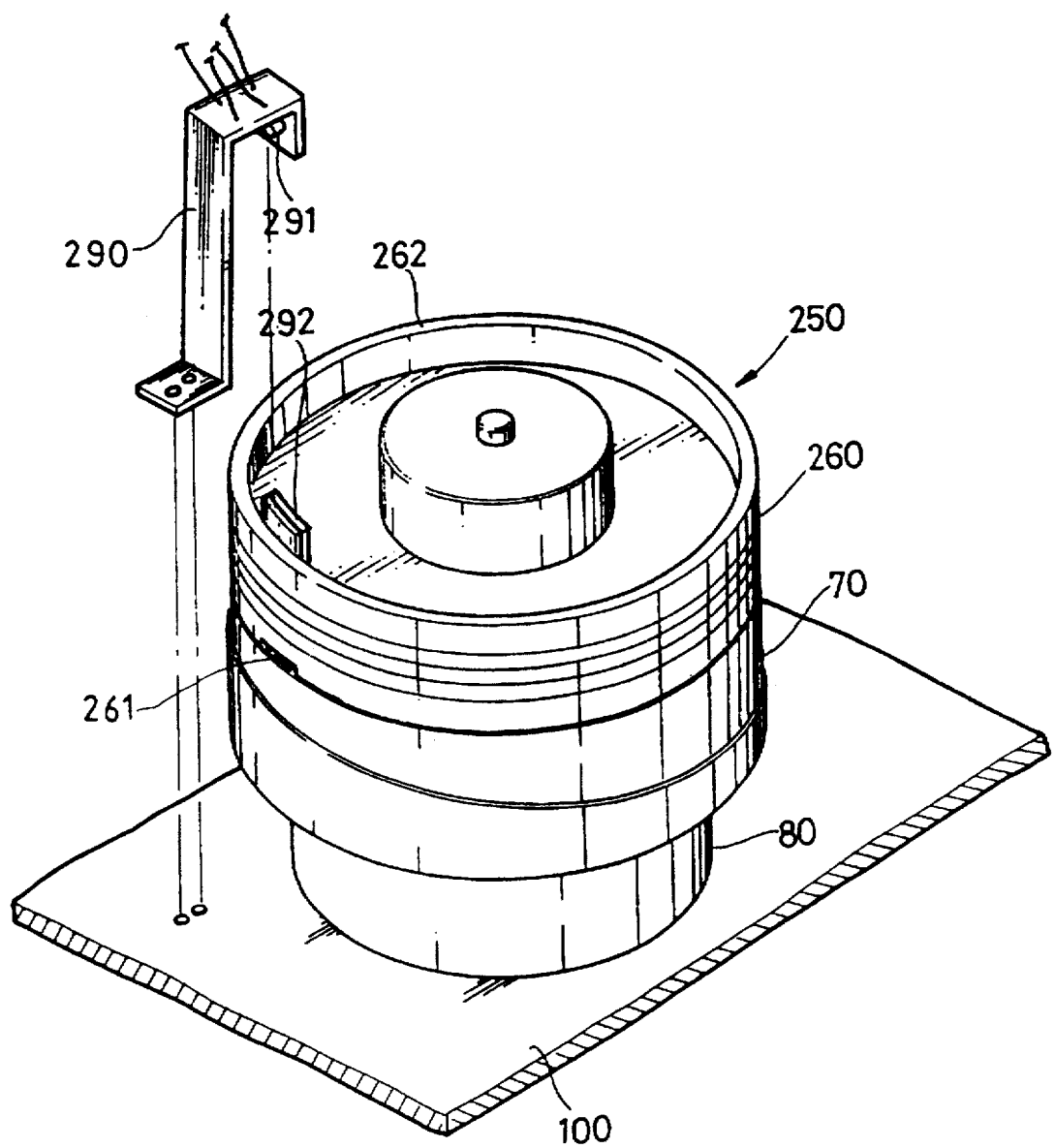
FIG. 7 is a perspective view of a head drum adopting a magnetic head position detecting apparatus according to still another preferred embodiment of the present invention.
Figure 8:
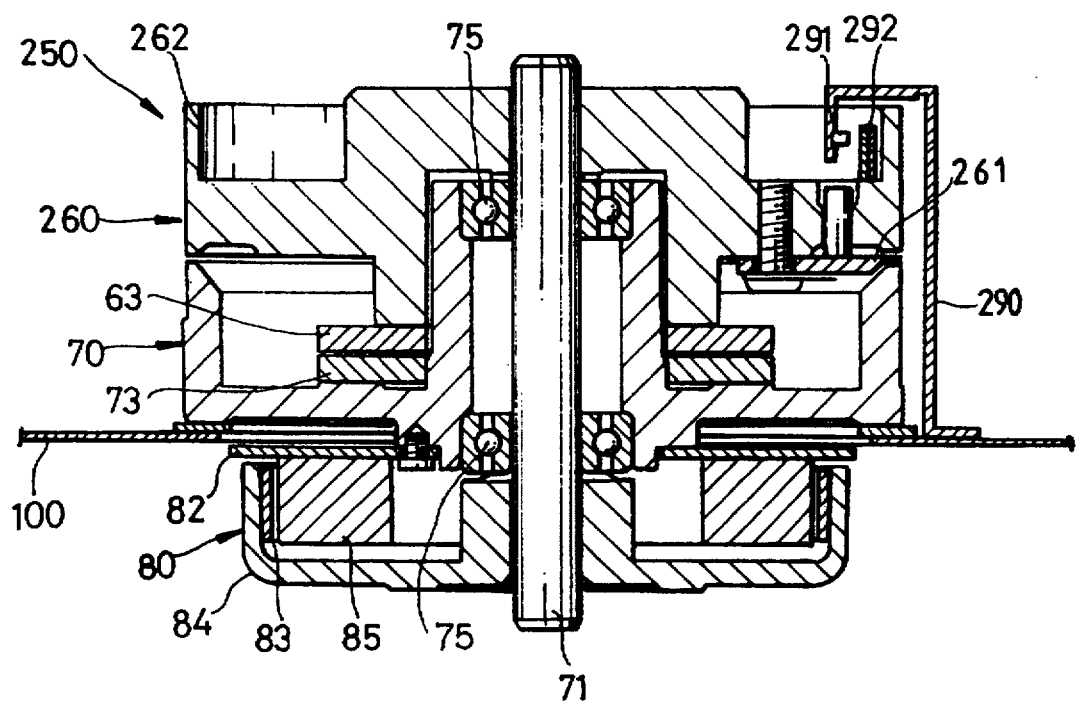
FIG. 8 is a cross-sectional view of the head drum shown in FIG. 7.

FIGS. 7 and 8 show a head drum 250 adopting a magnetic head position detecting apparatus according to still another preferred embodiment of the present invention. Here, the same reference numerals as those of the above figures represent the same elements. Referring to FIGS. 7 and 8, the magnetic head position detecting apparatus includes a magnet 292 having a predetermined width, installed on the upper surface of a rotary drum 260, a hall device 291 for detecting magnetic flux generated from the magnet 292 and a support 290 fixed on a deck 100, for supporting the hall device 291. Here, the magnet 292 is installed on the upper surface of the rotary drum 260 being opposite to the magnetic head 261.

In the operation of the magnetic head position detecting apparatus of a tape recorder having the above structure according to the present embodiment, when the rotary drum 260 rotates to thereby locate the magnet 292 at a position opposite the hall device 291, a magnetic flux generated by the magnet 292 is detected by the hall device 291. After a predetermined lapse of time from the start of detection, a control signal is applied to one of the magnetic heads 261 and the magnetic head which receives the control signal starts to scan the tape (not shown), simultaneously. Subsequently, after a predetermined lapse of time, the control signal is applied to the other magnetic head 261.

For example, after a predetermined lapse of time from when the magnetic flux is first detected, a control signal is applied to the magnetic head 261 scanning the tape during the driving of the drum motor 80 with a predetermined pulse number. Then, a control signal is applied to the other magnetic head 261 for during a predetermined pulse number of the drum motor 80. That is, after a predetermined lapse of time from the magnetic flux detection starting point, a control signal is applied to the plurality of magnetic heads 261 in sequence from the microcomputer (not shown).

As described above, the magnetic head position detecting apparatus according to the present invention is installed at the upper surface of the rotary drum in vertical alignment with the magnetic head, without forming a predetermined angle with the magnetic head, so that the assembly process thereof becomes simple and assembly error is sharply reduced.

It is contemplated that numerous modifications may be made to the magnetic head position detecting apparatus of a tape recorder of the present invention without departing from the spirit and scope of the invention as defined in the following claims.

What is claimed is:

1. A magnetic head position detecting apparatus of a tape recorder having a deck, and a rotary drum including a plurality of magnetic heads therein and a rib at the circumference of an upper surface of the rotary drum, said magnetic head position detecting apparatus comprising:

a blocking plate having a predetermined width, formed on the upper surface of said rotary drum in vertical alignment with a corresponding one of said magnetic heads;

sensing means for sensing said blocking plate; and a support, fixed on the deck, for supporting said sensing means.

2. The magnetic head position detecting apparatus as claimed in claim 1, wherein said sensing means comprises a luminescent device for emitting a beam and a receiving device for receiving the emitted beam.

3. A magnetic head position detecting apparatus of a tape recorder having a deck, and a rotary drum including a plurality of magnetic heads therein and a rib at the circumference of an upper surface of the rotary drum, said magnetic head position detecting apparatus comprising:

a window having a predetermined width, formed in said rib in vertical alignment with a corresponding one of said magnetic heads;

sensing means for sensing said window; and a support, fixed on the deck, for supporting said sensing means.

4. The magnetic head position detecting apparatus as claimed in claim 3, wherein said sensing means comprises a luminescent device for emitting a beam and a receiving device for receiving the emitted beam which has passed through said window.

* * * * *